UNITED STATES PATENT OFFICE.

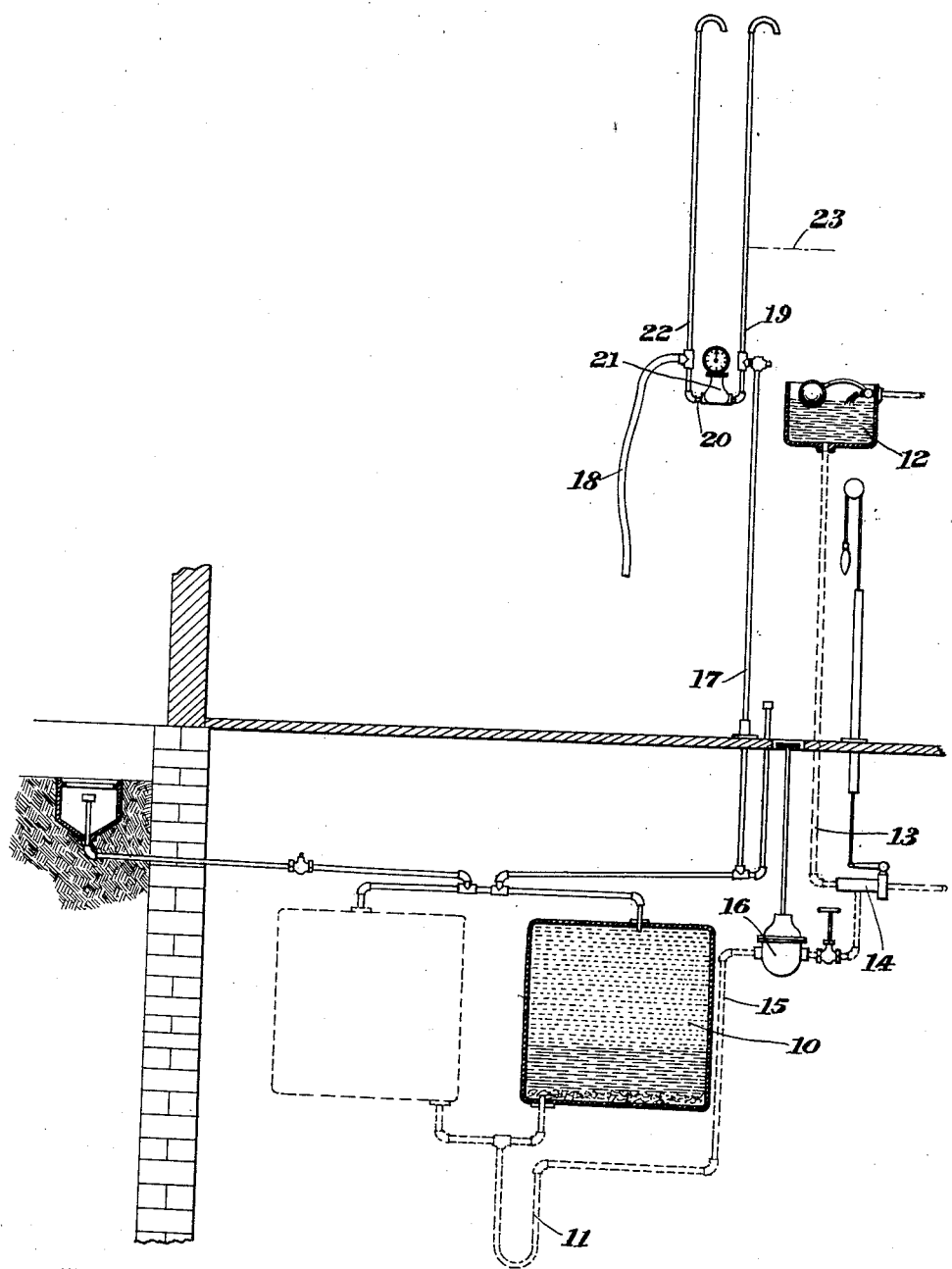

FLOYD W. SCHOCH, OF JERSEY CITY, NEW JERSEY.

OIL STORAGE AND DELIVERY APPARATUS.

1,226,914.   Specification of Letters Patent.   Patented May 22, 1917.

Application filed March 10, 1915. Serial No. 13,473.

*To all whom it may concern:*

Be it known that I, FLOYD W. SCHOCH, a citizen of the United States, and a resident of Jersey City, in the county of Hudson and State of New Jersey, have invented certain new and useful Improvements in Oil Storage and Delivery Apparatus, of which the following is a specification.

This invention relates to oil storage and delivery apparatus, and is particularly directed to improvements whereby the oil is accurately measured as it is delivered or dispensed through the agency of a hydraulic head.

The usual type of meter for measuring light oil such as gasolene or the like, to be used for motor vehicles, is very sensitive and will respond almost as readily to a current of air as to the flow of oil. Thus, should air get into the pipes and pass through the meter, the latter will not register accurately the amount of oil which has actually passed through the meter, but will register a higher figure.

To overcome these difficulties, I provide a system in which the meter is so disposed that at no time will it be possible for air to pass through the same, thus insuring accurate measurement, and this constitutes the principal object of the present invention.

The various further objects and advantages will be more fully set forth in the accompanying specification and the features of novelty will be particularly pointed out in the claims.

In the drawing illustrating this invention,

The figure is a diagrammatic sectional elevation illustrating my improved measuring system used in connection with a hydraulic storage and delivery system.

Referring in detail to the drawing, the oil is stored in the storage tank 10, into the bottom of which water is introduced under hydraulic head through the water leg 11 whenever oil is to be dispensed. I have illustrated a water tank 12 situated at a level corresponding to the height at which the oil is to be delivered and communicating with the storage tank through the downwardly extending pipe 13 and the three-way valve 14, pipes 15 and water leg 11. A water meter 16 is located in the pipe 15, but as this does not form part of the present invention, but is embodied in a co-pending application, Serial Number 13,474, the connection of the water meter is not described in detail. Leading from the top of the storage tank is the delivery pipe 17 finally terminating in the flexible pipe 18 from which the oil is dispensed into the gasolene tank of the autotmobile or other receptacle to be filled.

I will now describe the improved measuring system whereby the oil dispensed is measured with the utmost accuracy. The delivery pipe 17 opens into one of the arms 19 of a U shaped conduit, at the base 20 of which is connected the oil meter 21, and to the other arm 22 of which is connected the flexible dispensing pipe 18. The arms 19 and 22 extend to a height considerably above the points of connection of the pipes 17 and 18 therewith, so as to open some distance above the level, indicated in dotted lines 23, to which the oil would rise under the hydraulic head. These arms constitute air vents at both sides of the meter. It will be understood also that the oil meter is adapted to run only in one direction, that is, the direction in which the oil flows out of the tank to be delivered.

Now proceeding to the operation of the meter in the system above described, the lower portion of the U, up to the points of connection of the pipes 17 and 18 with the arms 19 and 22, is always filled with oil. We will assume now that it is required to dispense a certain amount of oil. The three-way valve 14 is opened so as to introduce the hydraulic head into the bottom of the tank 10, thus causing the oil to flow up the pipe 17. Any air in the latter pipe merely passes out through the upper portion of the arm 19 of the U, constituting the air vent on that side of the meter. As soon as the oil reaches the arm 19 and rises above the point of connection of the pipe 17 therewith, the oil will commence to flow out through the pipe 18, but in no event, will any air be trapped in the oil and pass through the meter, as will be readily understood. Then, when the valve 14 is shut off, the oil which has risen in the pipe 17 and in the arm 19 above the connection, runs back to the storage tank, while the oil remaining in the lower portion of the U cannot siphon back, as the vent 19 permits free access to the atmosphere to the top above formed by the connection of the pipe 17 with the arm 19. In the same manner also the vent 22 prevents the siphoning of the oil from the lower portion of the U through the discharge pipe 18.

It will be readily understood that as the meter cannot run backward and as according to the construction above set forth no air or gas can be trapped to flow through the meter, the latter will always register with the utmost accuracy the exact amount of oil dispensed.

I claim:

1. An oil measuring system comprising a delivery pipe, a vertical U shaped conduit, an oil meter disposed in the base of the latter, a connection between the delivery pipe and an intermediate point in the height of one of the arms of the U, and a discharge pipe leading from an intermediate point in the height of the other arm of the U, the upper extremities of the arms being open to the atmosphere to constitute air vents on either side of the meter.

2. In combination with an oil storage tank and water tank of a hydraulic oil storage and delivery system, of a delivery pipe extending from the storage tank, a U shaped conduit having arms opening to the atmosphere above the hydrostatic level to which the oil would rise under the influence of the hydrostatic head of the water tank, an oil meter disposed in the base of the U shaped conduit, a connection between the delivery pipe and an intermediate point in the height of one of the arms of the U, and a discharge pipe leading from an intermediate point in the height of the other arm of the U, the upper extremities of the arms being open to the atmosphere to constitute air vents on either side of the meter.

3. In combination with the delivery pipe of an oil storage delivery system, of a U shaped conduit, an oil meter disposed in the base of the U, a connection between the oil delivery pipe and one of the arms of the U, a discharge pipe connected with the other arm of the U, the upper ends of the arms being open to the atmosphere.

4. An oil storage and delivery system comprising an oil storage tank, a water tank situated above the storage tank, means for supplying water to the water tank, connections between the water tank and oil tank to communicate the hydraulic head of the water tank to the oil tank, a delivery pipe leading from the oil tank, means for accurately measuring the amount of oil delivered from the oil tank comprising a U shaped conduit, an oil meter disposed in the base of the U, a connection between the oil delivery pipe and one of the arms of the U, and a discharge pipe connected with the other arm of the U, the upper ends of the arms being open to the atmosphere.

5. An oil storage and delivery system comprising an oil storage tank, a water tank situated above the storage tank, means for supplying water to the water tank, connections between the water tank and oil tank to communicate the hydraulic head of the water tank to the oil tank, a valve in said connections for turning on and off the water from the water tank to the bottom of the oil tank, a delivery pipe leading from the oil tank, means for accurately measuring the amount of oil delivered from the oil tank comprising a U shaped conduit having arms extending above the level to which the oil would be raised by the hydraulic head of the water in the water tank, an oil meter disposed in the base of the U, a connection between the oil delivery pipe and one of the arms of the U intermediate the ends thereof, and a discharge pipe connected with the other arm of the U intermediate the ends thereof, the upper ends of the arms being open to the atmosphere.

Signed at New York city in the county of New York and State of New York, this 25th day of November, A. D. 1914.

FLOYD W. SCHOCH.

Witnesses:
MINNIE S. MILLER,
WM. I. COHEN.